July 25, 1950

H. F. OLSON 2,516,338

FEEDBACK CONTROL SYSTEM FOR RECORDING CUTTERS AND THE LIKE

Filed March 30, 1948

INVENTOR
HARRY F. OLSON
BY Morris A. Rakin
ATTORNEY

Patented July 25, 1950 2,516,338

UNITED STATES PATENT OFFICE 2,516,338

FEEDBACK CONTROL SYSTEM FOR RECORDING CUTTERS AND THE LIKE

Harry F. Olson, Princeton, N. J., assignor to Radio Corporation of America, a corporation of Delaware Application March 30, 1948, Serial No. 17,878

10 Claims. (Cl. 179—100.4)

Figures 1, 2, 3, 4, 5, 6:
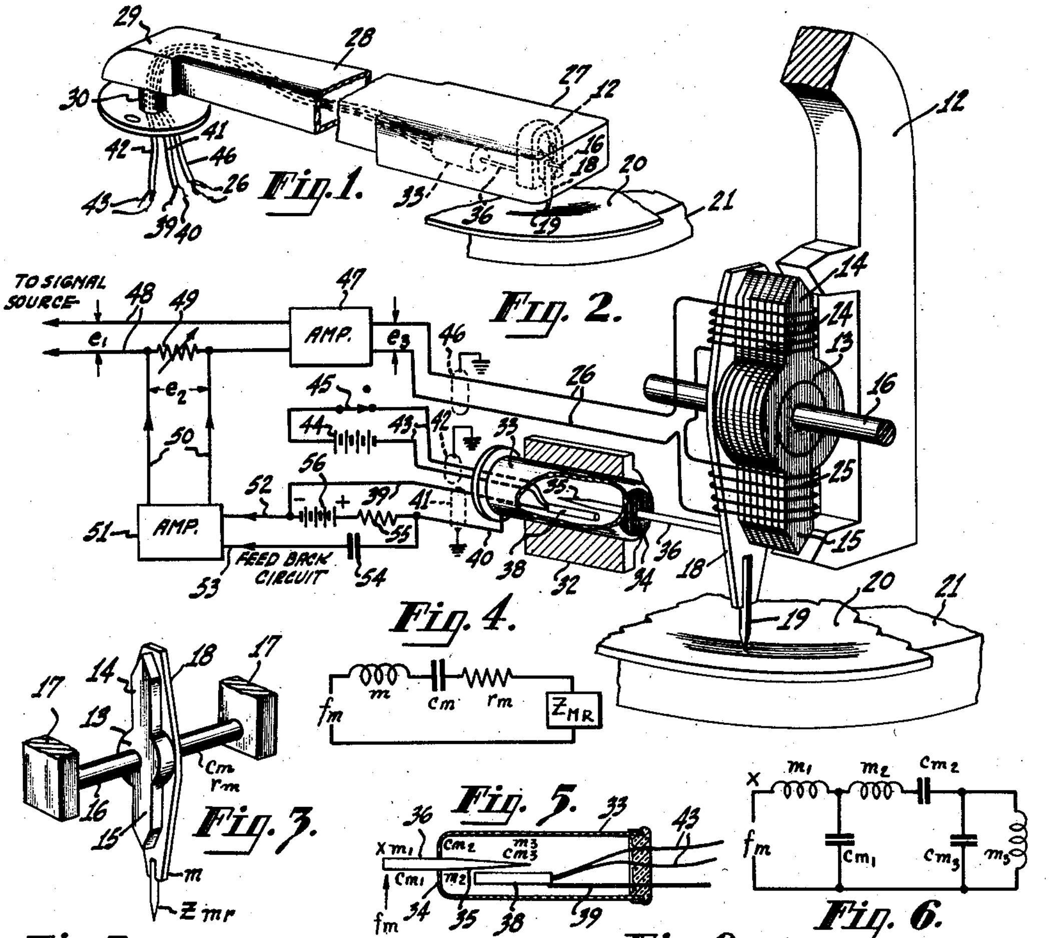

The present invention relates to a feedback system for recording cutters and the like. More particularly, the invention relates to an improved method and means for applying inverse feedback to recording cutters and like moving stylus devices responsive to audio frequency currents for recording purposes.

While the invention is applicable to any movable stylus type of recording device, it is particularly adapted for use in connection with a magnetic electro-mechanical cutter having a movable armature and a cutting stylus actuated in response to applied audio frequency currents, and contemplates the application of feedback to such armature and stylus whereby undesired responses in the operation thereof may appreciably be reduced or suppressed by application of the feedback principle.

Heretofore various forms of feedback generating means for this purpose have been provided in connection with electro-mechanical recorders, record cutters and the like, including piezo-electric crystal devices, variable capacity elements, and moving coil or electro-magnetic generator elements, mechanically connected with the armature and stylus elements to respond to movement thereof, and to generate a voltage or current for feedback purposes, which may be applied to various points in the signal supply system for the recorder, such as to the input of the recording amplifier for example.

Because of the association of the recorder with alternating current motor driven turntable or other motive means for the recording disk, and associated alternating current operated electrical apparatus, prevention of alternating current hum pickup in the recorder feedback circuits has presented many serious problems and often involves extensive shielding or other suitable expedient, adding cost and undesired mass or weight to the recording unit. This is necessarily so because the feedback voltage or current generating means requires close mechanical connection with the recording armature or stylus, being thereby located directly at the recording head.

Electromagnetic devices for feedback purposes are particularly vulnerable to hum pickup, in addition to being generally of considerable size or mass, and likewise piezo-electric devices as feedback generators are generally of large size and mass, although eliminating the possibility of electro-magnetic hum pickup are, as a matter of fact, often subject to hum pickup by capacity coupling or otherwise.

Electrostatic or capacity devices, while being of considerable aid in the matter of reducing weight and size and substantially eliminating hum pickup both electro-magnetically and electrostatically, require additional equipment such, for example, as an oscillator system for which the capacity elements provide modulating means, and the additional discriminator or detector system for deriving or recovering the audio frequency component of the frequency modulated signal, before this component may be used for the intended purpose of providing inverse feedback to the recorder input circuit. This, in itself, not only complicates the feedback system but adds greatly to its cost. In addition, unless due precautions are taken, the modulation and demodulation system may in itself introduce other forms of distortion.

Accordingly, it is a primary object of this invention, to provide an improved inverse feedback control system for recording cutters and the like, which substantially eliminates the above and other undesirable characteristics of previously known systems of that character, and which at the same time is simplified and highly efficient in the production of relatively high feedback signals.

It is also an object of the invention, to provide an improved inverse feedback control system of the character referred to, which in itself has no appreciable frequency characteristic whereby distortion may be introduced in the feedback loop, and which is of minimum mass and size, whereby it may directly be incorporated in a recording head without adding to the mass or size thereof to any appreciable extent.

It is a still further object of this invention, to provide an inverse or negative feedback system for a recorder adapted for record cutting and the like, wherein there may be no appreciable electro-magnetic or electro-static coupling between the cutter electro-magnetic driving elements or coils and the audio frequency feedback elements.

This desirable arrangement is provided by the use of a miniature type electronic tube, the impedance of the space path of which is varied by movement of a control electrode supported by a flexible diaphragm forming part of the wall structure of the tube and comprising cantilever beam elements extending internally and externally of the tube from the diaphragm, the external extension being joined with the cutter stylus or armature and the tube being supported directly in the cutter head in fixed relation to the moving elements thereof.

The device, in a preferred form, may be considered to operate as a variable resistance element, and is readily adapted for connection in any feedback circuit for controlling feedback voltage generation, such as a circuit comprising a voltage source and a series impedance, the electron path of the tube controlling the flow of current through the impedance from which feedback voltages are derived. Because of the variable resistance nature of the circuit and device, an undistorted translation of the armature and stylus movement into corresponding voltage variations is attained for application electrically to the signal supply circuit for the recorder, being introduced therein out of phase with the incoming signal in the usual manner to provide inverse feedback and distortion correction as is well known.

The novel features which are believed to be characteristic of the invention are set forth with particularity in the appended claims; the invention itself, however, both as to its organization and method of operation, will best be understood by reference to the following description, taken in connection with the drawing in which there are shown apparatus and circuit organizations whereby the invention may be carried into effect.

Figure 7:
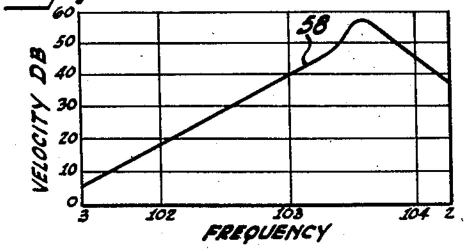
Figure 8:
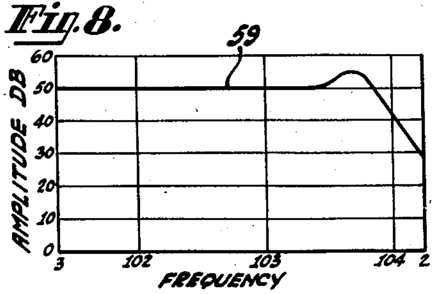
Figure 9:
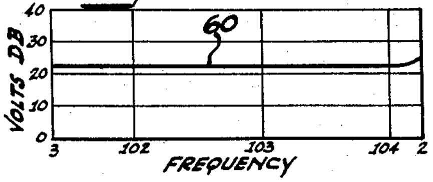
Figure 10:
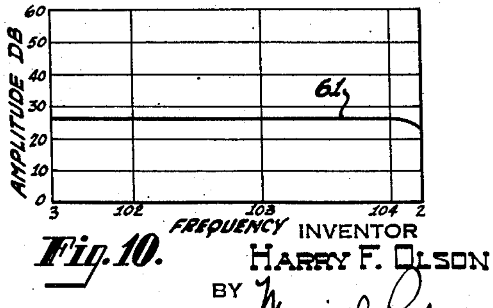

In the drawing:

Figure 1 is a view in perspective of a recorder head and arm provided with a feedback control device in accordance with the invention, Figure 2 is a schematic circuit diagram of an improved feedback control system for a disk recording cutter embodying the invention, Figure 3 is a view in perspective, and on a smaller scale, of a portion of a recording element shown in Figure 1, illustrating certain operating characteristics thereof, Figure 4 is an electrical circuit representation of the mechanical system of the device shown in Figure 3, Figure 5 is a cross-sectional view of an electronic tube element shown in Figure 2, illustrating certain operating and constructional characteristics thereof, Figure 6 is an electrical circuit representation of the mechanical system embodied in the tube structure of Figure 5, Figures 7 and 8 are graphs showing curves illustrating certain operating frequency characteristics of the mechanical system of Figure 3, Figure 9 is a further graph showing a curve illustrating an operating frequency characteristic of the tube structure of Figure 5, and Figure 10 is a graph showing a curve illustrating an overall corrected frequency response characteristic for the system of Figure 2.

Referring to Figures 1, 2, 3 and 5 in which like parts throughout are indicated by like reference numerals, a recording head of the electro-magnetic type is shown by way of example and comprises a permanent field structure 12 in which is mounted a movable armature 13 having two poles 14 and 15 and a fixed central pivot axis provided by a shaft 16 mounted in suitable bearing elements 17 (Figure 3). The armature is connected with a stylus carrier or bar 18 on the lower end of which is mounted a suitable stylus or cutter 19 adapted to engage the surface of a disk record blank 20 mounted on a rotary turntable indicated at 21.

As is well known, the turntable rotates to carry the blank under the stylus cutter which moves laterally to provide a laterally cut groove forming the sound record, in response to movement of the armature which is under control of an electrical signal supply circuit. In the present example the poles are provided with signal input windings 24 and 25 connected serially between two signal input leads 26 as shown for receiving audio frequency signals to actuate the recording head. As is well known, the arrangement shown provides motor means responsive to audio frequency signals for actuating the cutter and as shown, represents any suitable signal responsive cutter head for this purpose.

As is shown more fully in Figure 1, the cutter head is mounted in the free end 27 of a tone arm 28 pivotally mounted at its rear end 29 for movement laterally over the record surface, and vertically, as is well known, and the arm and pivotal mounting tube 30 provides a housing for the connection leads to the recording head as shown, and as will hereinafter be referred to. Rigidly mounted in the supporting structure of the pickup, as by means of a fixed supporting element 32, is a miniature electronic tube 33 having a metallic casing of elongated tubular shape as shown, and a flexible metallic diaphragm 34, forming part of the wall structure thereof and supporting centrally thereof a rod-like electrode element 35 extending inwardly from the diaphragm and having an external rod-like extension 36 connected with the stylus bar 18, and being thereby connected with the armature.

The connection of the electrode extension with the movable element of the recorder is at a point in spaced relation to the axis of rotation 16, whereby a desired degree of movement or vibration is imparted to the electrode 35 directly in accordance with movement of the armature and stylus. This movement is in a direction to cause a variation in the space between the electrode 35 and a second fixed metallic or conducting electrode 38, insulated from the casing and having an insulated external connection lead extending therefrom as indicated at 39. The electrode 35 is electro-conducting or metallic and is connected with the diaphragm 34 and the casing 33, both of which are metallic or conducting as noted, and thus provide an electrical connection therewith which may be considered to be at ground potential. The rod 36 is connected with the recorder head which is likewise metallic and grounded in the usual installation. An output lead 40 connected with the casing 33, is provided in association with the lead 39 as a shield to provide a single conductor shielded cable, as indicated by the dotted shield outline 41. The cable output lead or cable for the tube is likewise indicated in Figure 1.

In the present example, the movable electrode 35 may be considered to be a control electrode operated as an anode, while the electrode 38 may be considered to be a cathode electrode. The cathode electrode is of the indirectly heated type having a heater circuit comprising the leads 43 connected externally of the tube to a source of heating current 44 through suitable control switch means 45 which may be opened and closed to control the cathode heating current.

The miniature tube or electronic feedback transducer 33 may be of the type shown, described and claimed in my copending application Serial No. 706,967, filed October 31, 1946, now Patent No. 2,491,390, granted December 13, 1949, for Electronic Transducers. As pointed out therein, the control electrode rod 35—36 is supported by the diaphragm 34, and its inner end may be considered as a cantilever bar, one end of which is anchored at the diaphragm and the other end of which is freely suspended within the casing 33 which provides the evacuated envelope for the tube. The rod extension 36 provides a mechanical link between the stylus or armature and the movable electrode 35 within the tube or shield that can be actuated by forces of relatively small magnitude. At the same time, the device is adapted to withstand the atmospheric or external static pressure which is applied to the diaphragm and provides, in effect, a hermetically sealed electronic variable resistance device which, in connection with the feedback cutter, may effectively provide feedback voltages or signals of relatively high magnitude in response to vibration of the cutter.

The gain and fidelity of response are further enhanced by reason of the direct coupling to the cutter, without the usual undesirable electrostatic or electro-magnetic hum pickup normally present in such devices. This is prevented by reason of the fact that the device is provided with a metallic casing which forms an electrostatic shield operating at ground potential, and further by reason of the fact that the device is a pure resistance device having no frequency characteristic of its own and, therefore, having no susceptibility to electromagnetic coupling with other operating and feedback elements of the system.

Furthermore, the driving link or rod 35—36 between the source of the driving force, provided by the recording currents through operation of the armature 13, and the movable or vibrating electrode 35 will have a relatively small mechanical mass reactance. The voltage developed by the electronic generating system of the type under consideration is proportional to the amplitude of the vibration of the electrode 35. In order to maintain constant voltage output over a certain frequency band, such as the audio frequency band, for example, for recording systems of the type shown in the present example, the amplitude of vibration must be independent of the frequency over that frequency range, and the velocity is proportional to the frequency. Since the mechanical mass reactance is relatively low, the sensitivity of the system is relatively high and provides no appreciable load on the armature or cutter whereby to introduce distortion. This is an important feature of the invention, since in any of the transducer types for sound recording and pickup the available driving force is limited or fixed.

Audio frequency signals to be recorded are applied to the recording head and the operating coils 24 and 25, through the input leads 26, from a suitable amplifier 47, to the output of which the leads 26 are connected as shown, and to the input of which are connected an input or signal supply circuit 48 leading to any suitable signal source (not shown). Interposed in series with the input circuit 48 is a variable coupling impedance or resistor 49, to the terminals of which are connected feedback supply leads 50 connected with the output circuit of a second amplifier 51 in a feedback circuit. The input circuit for the amplifier 51, represented by the leads 52 and 53, is coupled to the electrodes 35 and 38 of the transducer device 33 through a coupling capacitor 54 across the impedance of a coupling resistor 55, which is connected serially in circuit with a constant potential supply source 56 between the electrode 35 and the electrode 38. The lead 39 from the cathode is connected to the lead 52 and to the negative terminal of the potential source 56. The anode 35 and the casing of the device 33 are connected through the ground or shield lead 40 to the lead 53 through the coupling capacitor 54, and to the positive terminal of the source 56 through the resistor 35.

With this arrangement, positive potential is applied to the anode 35 through the coupling resistor 55, and the resulting space current flowing between the cathode 38 and the anode 35 flows through the coupling resistor 55 and is modulated or varied by movement of the electrode 35 with respect to the cathode 38 in response to operation of the recording cutter and armature when audio frequency signals are applied thereto through the input circuit 48, the amplifier 47 and the input leads 26 to energize the operating windings 24 and 25.

Movement of the electrode 35 causes the spacing between it and the fixed electrode 38 to vary, thereby operating to vary the impedance of the space path of the electron tube and correspondingly to vary the current through the resistor 55. The current variation in the resistor sets up a variable signal voltage between the feedback circuit leads 52 and 53 corresponding electrically to movement of the cutter, and any undue response therein representing distortion or undesired resonance. This signal voltage is fed back through the amplifier 51 and the leads 50 to the input circuit 48 across the impedance 49 in out of phase relation to the input signal voltage to provide proper inverse feedback control. The valve of the impedance 49 may be adjusted to impart to the input circuit any desired portion of the feedback voltage for correction purposes.

Thus the application of the simple resistance control device, in the form of a small electronic cartridge or tube of low mass and mechanical impedance, attached to the stylus holder or cutter, and coupled to the input circuit through a simple resistance control circuit, provides adequate feedback control with a high degree of fidelity and without any of the disadvantages inherent in previously known systems for this purpose, since the feedback generator or control device is a variable resistance element having no frequency characteristic or instability in operation, and the output circuit therefor is of the simple resistance coupled type.

It will be noted that the leads 43 from the cathode heater and the leads 26 from the recording cutter coils may be cabled and suitably shielded as indicated at 42 and 46, respectively which shielding means may be connected to ground as indicated. The shielding provided is that normally provided for similar leads in recording and reproducing circuits and further provides for preventing hum pickup from surrounding equipment and adjacent circuits.

The amplified output of the electronic transducer 33 is therefore supplied to the input circuit of the main amplifier 47 in out of phase or inverse relation to the signal, which drives the cutter armature. The voltage output of the electronic transducer and the amplifier 51 is given by the equation:

$$e_2 = K_1 X_1 \qquad (1)$$

where $K_1$=constant of the transducer and amplifier 51, and $X_1$=amplitude of displacement of the anode rod.

The force generated in the armature by the driving current is given by the equation:

$$f_M = K_2 n i \qquad (2)$$

where $K_2$=constant involving flux, air gap, reluctance of the magnetic system,
$n$=number of turns in the coil, and
$i$=current in the coil.

The velocity of the armature is given by the equation:

$$\dot{X}_1 = \frac{f_M}{r_M + j\omega m + \frac{1}{j\omega C_M} + z_{MR}} = \frac{f_M}{z_{MT}} \qquad (3)$$

$z_{MR}$=stylus load.

where $r_M$, $m$ and $C_M$ are the mechanical resistance, mass and compliance of the armature of Figures 3 and 4. A typical velocity frequency-characteristic is shown by the curve 58 in Figure 7. The amplitude frequency characteristic of the same system is shown by the curve 59 in Figure 8. The amplitude is given by dividing Equation 3 by $\omega$.

The mechanical resistance, mass and compliance of the inner and outer extensions of the anode rod or control electrode of the transducer device 33 and likewise of the flexible diaphragm are indicated in Figures 5 and 6. It will be noted that the mechanical resistance is substantially negligible and therefore not indicated thereon, and at the same time the mass is relatively low or negligible and the compliance relatively high, so that the load on the cutter is substantially negligible.

The voltage frequency characteristic of the electronic transducer for constant amplitude at point X of Figures 5 and 6 is shown by the curve 60 in Figure 9.

The amplified driving voltage $e_3$ of Figure 1, is given by the equation:

$$e_3 = K_3(e_1 - e_2) \qquad (4)$$

where $K_3$=constant of the amplifier 2.

Now the current $i$ is given by the equation:

$$e_3 = i z_{EC} \qquad (5)$$

where $z_{EC}$=electrical impedance of the coil.

Eliminating all but $e_1$ and $X_1$ from Equations 1, 2, 3, 4, and 5, and there results the following equation, $$X_1 = \frac{K_3 e_1}{\frac{\omega z_{EC} z_{MT}}{K_2 n} + K_1 K_3} \qquad (6)$$

how if $$K_1 K_3 \gg \frac{\omega z_{EC} z_{MT}}{K_2 n}$$

then $$X_1 = \frac{e_1}{K_1} \qquad (7)$$

The amplitude of displacement of the anode rod 36 and the stylus or armature is, therefore, proportional to the signal input voltage $e_1$ as is desired for full fidelity. The response-frequency characteristic is shown by the curve 61 in Figure 10. The use of feedback, therefore, causes the non-uniform amplitude-response frequency-characteristic of Figure 8 to be uniform with respect to frequency, as shown by the curve 61 in Figure 10. It is necessary in any case that all the precautions with regard to phase shift in feedback systems be observed.

From the foregoing description it will be seen that the damping in the feedback system of Figure 1 is practically negligible and for this reason the response will be extremely high at the resonant frequency of the cutter system. By suitable selection of constants, the resonant frequencies of the internal and external portions of the control electrode 35 may be located outside of the desired audio frequency band for which the recorder is responsive.

The system described has a further advantage in that vibration of the control electrode 35 may provide relatively wide changes in current flow through the space path of the transducer and, therefore, effective feedback voltages for introduction into the input system or other suitable point in the signal supply circuit for the cutter are provided without excessively high amplification.

While the invention has been shown in its application to a magnetic recorder of a well known type, it is not limited thereto, but may be applied to other recording devices in a similar manner without introducing distortion or mechanical resonance, and at the same time obviating all of the inherent disadvantages common to prior known devices as hereinbefore described.

I claim as my invention:

1. The combination with a recording device having a vibratory recording element, of an electronic variable resistance device having a vibratory control element of relatively low mass reactance mechanically connected directly with said recording element, an output circuit for said resistance device for deriving a voltage therefrom in response to operation of said control element by said recording element, a signal input circuit for said recording device and a feedback connection between said last named circuit and the output circuit for said variable resistance device.

2. The combination with a recording device having a vibratory recording element, of a miniature electronic tube having a vibratory control electrode coupled to said element, said electrode having a low effective mass and a high degree of compliance and being operative to vary the space path impedance of said tube in response to movement thereof, a signal supply circuit for said recording device, and an inverse feedback circuit responsive to impedance variations of said electronic tube device coupled to said signal supply circuit for introducing inverse feedback voltages therein in response to applied signals.

3. In an audio frequency recording system, the combination with a signal supply circuit, of a recording device having a vibratory recording element, an audio frequency current responsive actuating means therefor connected to said signal supply circuit, an amplifier in said connection, an electronic variable resistance device having a movable control element of low effective mass directly coupled to said recording element for vibratory movement therewith to vary the impedance of the space path of said resistance device, an output coupling impedance in circuit with said variable resistance device, and a feedback connection between said coupling impedance and said signal supply circuit.

4. In a recording system comprising a signal amplifier and a recording transducer coupled thereto, the combination therewith of an electronically variable resistance device mechanically coupled to said transducer for translating signals applied to said transducer into resistance variations, means for deriving from said resistance variations audio frequency voltages, and means for applying to the input terminals of said amplifier at least a portion of said voltages in predetermined phase relation to signals applied to said amplifier.

5. In combination, an electro-mechanical transducer having a movable armature element and a signal input circuit, a miniature type electronic tube fixedly mounted in the transducer and having an evacuated envelope and a movable control electrode therein for varying the internal resistance thereof, said electrode comprising rod-like elements extending internally and externally of the tube and the external extension being joined with the transducer armature element to move in unison therewith, said rod-like elements having relatively small mechanical mass reactance, and a resistance coupling network including the internal resistance of said tube having an inverse feedback connection with the signal input circuit of the transducer.

6. In an inverse feedback system for a recording electro-mechanical transducer having a movable armature element and a signal input circuit, the combination of a miniature type electronic tube fixedly mounted in the transducer and having an evacuated envelope and a movable control electrode therein for varying the space path impedance thereof, a flexible diaphragm forming part of the wall structure of the tube supporting said electrode, said electrode comprising cantilever beam elements extending internally and externally of the tube from the diaphragm and the external extension being joined with the transducer armature element to move in unison therewith in response to applied signals through said input circuit, said beam elements having relatively small mechanical mass reactance whereby the amplitude of vibration thereof is independent of frequency within the operating range of the transducer and the velocity thereof may be proportional to frequency within said range, and a resistance coupling network including the space path impedance of said tube having an inverse feedback connection with the signal input circuit of the transducer.

7. In combination, an electro-mechanical transducer having a movable armature element and a signal input circuit including a signal amplifier, a miniature type electronic tube fixedly mounted in the transducer and having an evacuated envelope and a movable control electrode therein for varying the space path impedance thereof, said electrode comprising cantilever beam elements extending internally and externally of the tube and the external extension being joined with the transducer armature element to move in unison therewith in response to applied signals through said input circuit and amplifier, said beam elements having relatively small mechanical mass reactance whereby the amplitude of vibration thereof is independent of frequency within the operating range of the transducer and the velocity thereof may be proportional to frequency within said range, a resistance coupling network including the space path impedance of said tube having an inverse feedback connection with the signal input circuit of the transducer preceding said first named amplifier, and a second signal amplifier in said connection.

8. In combination, a signal input circuit providing a source of control voltages, a first amplifier connected with said signal input circuit for amplifying control voltages therefrom, an electro-mechanical transducer having a recording stylus, circuit means for energizing said transducer to actuate said recording stylus in response to amplifier control voltages from said first amplifier, an electronic tube device in said transducer, said tube device having a movable electrode mechanically coupled to said recording stylus, said tube device providing a variable resistance element the effective value of which is varied by displacements of said movable electrode by said recording stylus, a resistance network coupled to said tube device to derive therefrom a variable feedback voltage corresponding electrically to displacements of said recording stylus, a second amplifier coupled to said network to amplify said feedback voltage and, variable means to couple said second amplifier feedback voltage output to said signal input circuit preceding said amplifier.

9. In a sound recording system provided with an electro-mechanical transducer adapted to be driven from an audio frequency energy source, the improvement comprising an electronic tube in said transducer having mechanical means for varying its interelectrode resistance, means to couple said mechanical means to said transducer for translating energy applied to the transducer into resistance variations, and means for deriving voltages from said resistance variations substantially dependent upon said resistance variations and means to feed said voltage variations back to said energy source.

10. In a record cutter unit of the type employing a vibratory stylus member and motor means connected therewith for moving said stylus member in response to applied signals, the improvement which comprises a miniature electronic tube device fixedly mounted in said record cutter adjacent said motor means and having a movable control electrode for varying the space path impedance thereof, said electrode comprising beam elements extending internally and externally of the tube and the external extension being joined with the stylus member to move in unison therewith and further having a relatively small mechanical mass reactance of a value such that the amplitude of vibration thereof is independent of frequency within the operating range of the record cutter unit and the velocity thereof may be proportional to frequency within said range, and a network coupled to said tube device to derive therefrom voltages having an amplitude and frequency substantially dependent upon the amplitude and frequency of said movable control electrode driven by said stylus.

HARRY F. OLSON.

REFERENCES CITED

The following references are of record in the file of this patent:

UNITED STATES PATENTS

| Number | Name | Date |
|---|---|---|
| 1,535,538 | Masfield | Apr. 28, 1925 |
| 2,182,136 | Ricchiardi | Dec. 5, 1939 |
| 2,194,175 | Wilhelm | Mar. 19, 1940 |
| 2,400,953 | Roys | May 25, 1943 |